United States Patent Office 2,700,670
Patented Jan. 25, 1955

2,700,670

DERIVATIVES OF 3,5-DIOXO-PYRAZOLIDINE

Franz Häfliger, Basel, Switzerland, assignor to J. R. Geigy, A. G., Basel, Switzerland, a Swiss firm No Drawing. Original application October 25, 1951, Serial No. 253,227. Divided and this application August 29, 1952, Serial No. 307,161

3 Claims. (Cl. 260—310)

The present application is a division of copending application, Serial No. 253,227, now abandoned, and is concerned with new derivatives of 3.5-dioxo-pyrazolidine and their salts and the processes for the production thereof. The new compounds correspond to the following general formula:

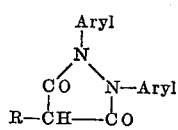

(I)

or to their tautomeric forms wherein R represents a nitrogen-containing radical, and Aryl represents a substituted or unsubstituted phenyl radical.

Halogen atoms, alkyl, hydroxy, alkoxy, acyloxy, nitro, amino, alkylamino, acylamino, carbalkoxy, hydroxyalkyl, carbalkoxyalkyl groups for example come into question as substituents of the phenyl radicals. The following may be listed as nitrogen-containing radicals R: $NH$, N-alkyl, $CO$—$NH$, $CO$—$N(alkyl)$, $SO_2NH$, $SO_2$—$N(alkyl)$, $HN$—$CO$, $(alkyl)N$—$CO$. These atom groupings can be in any positioned desired, e. g. in the $\alpha$-, $\beta$-, $\gamma$-, $\delta$-position. The length of the chain of the radical R including the nitrogen atom should not consist of more than 10 members. For example, R may represent the following radicals: dimethyl, and diethylaminomethyl radicals; methylamino, ethylamino, propylamino, allylamino, N-methyl-anilino, benzylamino, dimethylamino, diethylamino, piperidino, -ethyl, -propyl, -isopropyl or -butyl radicals; acetamino, N-acetyl-methylamino, N-benzoylmethylamino, N-methane-sulphonyl-ethylamino, N-ethane sulphonyl-methylamino, benzene sulphonyl-amino, -ethyl, -propyl or -butyl radicals; N-ethyl-carbamyl, N-propyl-carbamyl, N.N-dimethylcarbamyl, N.N-diethylcarbamyl, -methyl, -ethyl, -propyl or -butyl radicals and such like.

The defined 1.2-diaryl-3.5-dioxo-pyrazolidines of the Formula I are produced in principle by condensation of suitable malonic acid derivatives with 1.2-diaryl hydrazines (hydrazo benzenes).

Thus a reactive derivative of a monosubstituted malonic acid of the formula:

$$R—CH(—CO—X)_2 \quad (II)$$

wherein X represents a radical of the carboxylic acid derivative which can be split off such as for example halogen (acid halide), an alkoxy group (ester), etc., can be reacted with a 1.2-diaryl hydrazine of the formula:

$$\text{Aryl-NH—NH-Aryl} \quad (III)$$

advantageously in the presence of a condensing agent or an acid binding agent. The reaction procedure is given in detail below.

A prefered method of manufacture consists in heating a dialkyl ester, above all the diethyl ester, of a monosubstituted malonic acid, with a diaryl hydrazine in the presence of a metal alcoholate, e. g. sodium ethylate or potassium tert. butylate. This brings about ring-closure with the splitting off of two molecules of the alcohol, which it is convenient to distil off, at temperatures between 100 and 200° C.

Generally such compounds come into consideration as condensing agents as are suitable for the replacement of a replaceable hydrogen atom by a metal atom, such as alkali metals and active alkali compounds.

Other ways of carrying out the same process are described below. These modifications consist in using other reactive derivatives instead of a di-ester of malonic acid of Formula II, such as, for example, a dihalide, an ester halide.

Condensation of a diarylhydrazine of Formula III with a malonic acid halide of Formula II, e. g., the dichloride, takes place in a solvent which is indifferent to the acid halide, such as ether or benzene. In order to repress as far as possible the rearrangement of the diaryl hydrazine by the halogen hydracid produced, it is advisable to carry out the condensation in the presence of an acid binding agent, preferably a tertiary organic base such as pyridine or dimethyl aniline. In this case the reaction takes place even at low temperatures which may suitably be in the neighbourhood of 0° C.

The condensation can be carried out in steps especially if unsymmetrical reactive derivatives of malonic acid (Formula II) are used. For example, the ester chloride $Cl—CO—CH(R)—COO$-alkyl can be treated with a diaryl hydrazine III to give firstly the acyl derivative IV, by allowing the components to react in the ratio of their molecular weights in ether or benzene in the presence of pyridine. Ring closure may then be brought about by heating with sodium ethylate:

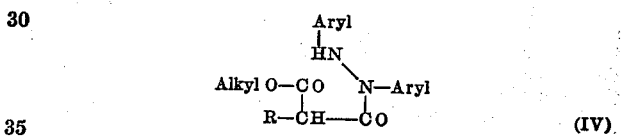

(IV)

Instead of a diaryl hydrazine of Formula III and N-acyl derivative of the same, e. g., N-acetyl-hydrazobenzene, can also be reacted with the reactive derivative of a malonic acid of Formula II, especially with a dialkyl ester. On heating with the condensing agents named, the acyl radical is split off, the ring closing to give the pyrazolidine derivative of Formula I.

The monosubstituted malonic acids and/or their reactive derivatives of Formula II are known to a great extent. They can be produced by the introduction of the radical R into the malonic acid or its esters in an analogous manner to that described in the following for the introduction of this radical into the 4-position of a 1.2-diaryl-3.5-dioxo-pyrazolidine.

A second variation of the process for the production of the pyrazolidine derivative of Formula I can in some cases be of advantage, since it proceeds not from derivatives of substituted malonic acid (II) but directly from those of malonic acid itself, for example, from malonic acid diethyl ester. This method consists in introducing the radical R into the 4-position of a 1.2-diaryl-3.5-dioxo-pyrazolidine of Formula V in a manner to be more closely described in the following.

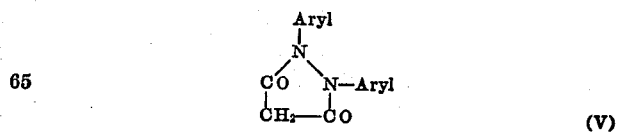

(V)

To introduce the radical R, the pyrazolidine derivative V or a salt thereof, is reacted preferably in the presence of an acid binding agent with a compound of the formula R—X where X means an atom or a radical which is split off such as Cl, Br, I, $SO_4R$ or $SO_3Aryl$.

The temperature necessary for the reaction depends on the reactivity of the compound R—X; it is well known, for example, that iodine compounds react more easily than bromine compounds. The setting in of the reaction as well as its course can be easily followed by the formation of the X ions. Generally speaking, temperatures between 0° C. and 100° C. are suitable.

The group R can also be introduced by hydrogenating the diketopyrazolidine V in the presence of a carbonyl compound of the formula R'=O, where R' stands for a hydrocarbon radical (alkylidene radical) containing nitrogen atoms, the oxygen atom being bound by two valences from one and the same carbon atom. Because of its simplicity and the good yield this process is of special interest technically.

A variation of this method consists in hydrogenating the condensation product VI derived for example from the dioxo-pyrazolidine V and the carbonyl compound R'=O.

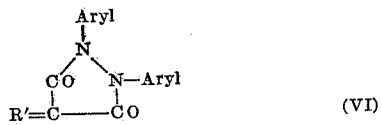
(VI)

In both cases, hydrogenation is preferably carried out with hydrogen in the presence of a catalyst, such as finely divided nickel, platinum or palladium. Other reducing procedures, such as the use of sodium amalgam and water offer no advantages over this method.

However, it must be noted in connection with this process that when the radical R' contains an aliphatic double bond it is difficult to avoid hydrogenating it and the yield in such circumstances is usually unsatisfactory. On the other hand, the corresponding saturated derivative can be easily prepared. Consequently the process is primarily suitable for the manufacture of those pyrazolidine derivatives of Formula I in which the radical R contains no aliphatic double bonds.

Should the nitrogen atom be in the α-position of the side chain R, in certain cases the corresponding reactive formyl compounds (formic acid ester) or glyoxylic acid derivatives, e. g. glyoxylic acid esters can be used in the preceding process as carbonyl compounds.

The dioxo-pyrazolidines of Formula V can be prepared by the methods known per se for the manufacture of 1.2-diphenyl-3.5-dioxo-pyrazolidine; the most suitable is the condensation of malonic ester with the corresponding diaryl hydrazine of Formula III in the presence of a metal alcoholate, e. g. sodium ethylate.

The substituted pyrazolidine derivatives of Formula VI are derived from the unsubstituted parent compounds V by methods known per se (BI. Chem. Soc. Japan, 1931, 6, 1–9; 1932, 7, 45–50).

Finally a third variation consists of introducing the radical R in steps. This is done by introducing e. g. a nitrogen-containing radical into an unsubstituted malonic acid derivative, preferably malonic acid ester or 1.2-diaryl-3.5-dioxo-pyrazolidine of Formula V. The dioxo-pyrazolidine ring can then be closed by condensation of the substituted malonic acid derivative with a 1.2-diaryl hydrazine. The radical R is then built up in the manner known per se in the intermediate products so obtained of the Formula VII:

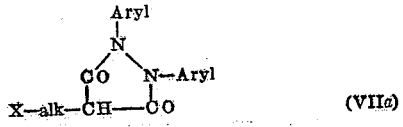
(VIIa)

or

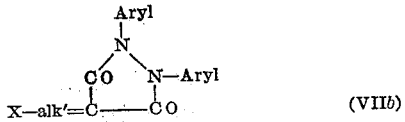
(VIIb)

wherein alk or alk' represents a substituted alkyl or alkylidene group and X represents a replaceable group such as halogen.

On reacting the intermediate products of Formula VII, in which X represents halogen, with primary or secondary amines, end products results in which R contains a substituted amino group. If the amino group has still one or two hydrogen atoms, then it can be acylated with reactive carboxylic or sulphonic acid derivatives.

Any double linkages occurring in the side chain R, e. g. in alkylidene compounds can be hydrogenated later to form saturated end products.

A particular variation of the process for production of end products or corresponding intermediate products having the nitrogen atom in the α-position of the side chain R, consists in reacting 1.2-diaryl-3.5-dioxo-pyrazolidines of the Formula V with formaldehyde to obtain the corresponding methylol compounds. The above 1.2-diaryl-3.5-dioxo-pyrazolidines may also be reacted with formaldehyde and halogen hydracid to form the corresponding halogen methyl compounds which can then be converted into the end products as described above. Also, if the reaction with formaldehyde takes place in the presence of secondary aliphatic or cycloaliphatic amines, basic end products are obtained direct.

The 1.2-diaryl-3.5-dioxo-pyrazolidines of Formula I preparable according to the invention are useful as therapeutics. They have antiphlogistic properties.

The compounds can also form salts with basic and acid compounds. For example, water soluble salts are formed with hydrochloric acid.

The salt can be obtained in solid form when desired either by evaporation of the filtered solution or by adding a solvent in which the salt is insoluble, for example, by the addition of ether to an alcoholic solution of the salt.

In the following example a method of carrying out the manufacture is described. Parts are by weight. The relationship of parts by weight to parts by volume is that of kilogrammes to litres. The temperatures are in degrees centigrade.

*Example*

126 parts of 1.2-diphenyl-3.5-dioxo-pyrazolidine are dissolved in 525 parts by volume of 2 N caustic soda lye. A solution of 94 parts of β-chlorethyl-diethylamine hydrochloride in 150 parts of water is then added and the whole is heated to 85–90° while stirring. After a short time, the 1.2-diphenyl-3.5-dioxo-4(β-diethylamino ethyl)-pyrazolidine begins to separate. After heating for 1 hour, the reaction mass is allowed to cool and is then filtered under suction. The residue is dissolved in 2 N caustic soda lye, any undissolved particles are filtered off and the filtrate is made weakly acid to litmus. The precipitate is filtered off under suction and dissolved in 2 N hydrochloric acid. The solution is filtered and neutralised with ammonia. The precipitate is drawn off under suction and recrystallised from alcohol. It is 1.2 - diphenyl - 3.5 - dioxo - 4 - (β - diethylamino ethyl)-pyrazolidine and melts at 228–230° on decomposition.

The following compounds for example can be prepared by analogous or similar methods to those described above: 1.2 - diphenyl - 3.5 - dioxo - 4 - (β - dimethylaminoethyl)-pyrazolidine, 1.2 - diphenyl - 3.5 - dioxo - 4 - (γ - diethylamino - propyl) - pyrazolidine, 1.2 - diphenyl - 3.5 - dioxo-4-(β-piperidino-ethyl)-pyrazolidine.

What I claim is:

1. A member selected from the group consisting of compounds of the formula:

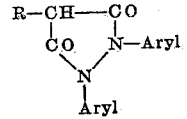

wherein R represents a member of the group consisting of dimethylamino ethyl, diethylamino ethyl, dimethylamino propyl, diethylamino propyl and β-piperidino ethyl radicals, and Aryl represents a phenyl radical substituted by a member selected from the group consisting of H, methoxy and ethoxy and salts thereof with hydrochloric acid.

2. 1.2 - diphenyl - 3.5 - dioxo - 4 - (β - diethylaminoethyl)-pyrazolidine.

3. 1.2 - diphenyl - 3.5 - dioxo - 4 - (β - diethylaminoethyl)-pyrazolidine hydrochloride.

References Cited in the file of this patent

Stenzl et al.: Chemical Abstracts, vol. 46, col. 105, 1952.